United States Patent
Jackson, Jr. et al.

(10) Patent No.: US 12,132,941 B2
(45) Date of Patent: *Oct. 29, 2024

(54) SYSTEM AND METHOD FOR PRESENTING CONTEXTUAL CLIPS FOR DISTRIBUTED CONTENT

(71) Applicant: NBCUniversal Media, LLC, New York, NY (US)

(72) Inventors: Jack Jackson, Jr., Stamford, CT (US); David Faulknor, Stamford, CT (US); Shannon McKenzie, Stamford, CT (US)

(73) Assignee: NBCUniversal Media, LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/970,385

(22) Filed: Oct. 20, 2022

(65) Prior Publication Data

US 2023/0118824 A1   Apr. 20, 2023

Related U.S. Application Data

(63) Continuation of application No. 15/599,385, filed on May 18, 2017, now Pat. No. 11,509,944.

(51) Int. Cl.
*H04N 21/239* (2011.01)
*H04N 21/2187* (2011.01)
(Continued)

(52) U.S. Cl.
CPC ... *H04N 21/23424* (2013.01); *H04N 21/2187* (2013.01); *H04N 21/4722* (2013.01);
(Continued)

(58) Field of Classification Search
None
See application file for complete search history.

(56) References Cited

U.S. PATENT DOCUMENTS 6,751,776 B1   6/2004   Gong
8,358,917 B2   1/2013   Schmouker et al.
(Continued)

FOREIGN PATENT DOCUMENTS

EP   2775731   9/2014
WO   2015128758   9/2015

OTHER PUBLICATIONS

U.S. Appl. No. 15/599,385, Office Action dated Jun. 1, 2018, 14 pages.
(Continued)

*Primary Examiner* — Brian T Pendleton
*Assistant Examiner* — Jean D Saint Cyr
(74) *Attorney, Agent, or Firm* — LEE, HONG, DEGERMAN, KANG & WAIMEY

(57) ABSTRACT

Systems and methods for presenting contextual clips for distributed content are disclosed. Some embodiments include receiving an input for presenting content while the content is currently being distributed at a first distribution time point within the content, transmitting a request for contextual content prior to the first distribution time point, receiving information for displaying a plurality of contextual content clips distributed prior to the first distribution time point, wherein each of the plurality of contextual content clips corresponds to an event depicted in the content, displaying the plurality of contextual content clips using the received information, and displaying the content at a second distribution time point after all of the plurality of contextual content clips have been displayed.

16 Claims, 12 Drawing Sheets

(51) Int. Cl.
| | |
|---|---|
| *H04N 21/234* | (2011.01) |
| *H04N 21/266* | (2011.01) |
| *H04N 21/43* | (2011.01) |
| *H04N 21/433* | (2011.01) |
| *H04N 21/4722* | (2011.01) |
| *H04N 21/475* | (2011.01) |
| *H04N 21/478* | (2011.01) |
| *H04N 21/488* | (2011.01) |
| *H04N 21/81* | (2011.01) |
| *H04N 21/8549* | (2011.01) |
| *H04N 21/235* | (2011.01) |
| *H04N 21/84* | (2011.01) |
| *H04N 21/845* | (2011.01) |

(52) U.S. Cl.
CPC ....... *H04N 21/478* (2013.01); *H04N 21/8549* (2013.01); *H04N 21/2353* (2013.01); *H04N 21/84* (2013.01); *H04N 21/8456* (2013.01)

(56) References Cited

U.S. PATENT DOCUMENTS

| | | | |
|---|---|---|---|
| 9,332,285 | B1 | 5/2016 | Grant et al. |
| 11,509,944 | B2 | 11/2022 | Jackson et al. |
| 2003/0093790 | A1 | 5/2003 | Logan et al. |
| 2009/0100454 | A1 | 4/2009 | Weber |
| 2009/0119704 | A1 | 5/2009 | Dimitrova et al. |
| 2010/0123830 | A1 | 5/2010 | Vunic |
| 2010/0153856 | A1 | 6/2010 | Russ |
| 2011/0078001 | A1 | 3/2011 | Archer et al. |
| 2013/0226983 | A1 | 8/2013 | Beining et al. |
| 2013/0260896 | A1 | 10/2013 | Miura et al. |
| 2013/0294755 | A1 | 11/2013 | Arme et al. |
| 2013/0297706 | A1 | 11/2013 | Arme et al. |
| 2014/0082663 | A1 | 3/2014 | Neumeier et al. |
| 2014/0101707 | A1* | 4/2014 | Kishore ............ H04N 21/8456 725/86 |
| 2015/0016800 | A1 | 1/2015 | Bowers et al. |
| 2015/0100979 | A1 | 4/2015 | Moskowitz et al. |
| 2015/0128046 | A1 | 5/2015 | Cormican et al. |
| 2015/0243325 | A1 | 8/2015 | Pacurariu et al. |
| 2015/0375117 | A1 | 12/2015 | Thompson et al. |
| 2016/0105734 | A1* | 4/2016 | Packard ........... H04N 21/23424 725/32 |
| 2016/0316280 | A1 | 10/2016 | Bulley et al. |
| 2016/0359937 | A1 | 12/2016 | Chung et al. |
| 2016/0373817 | A1 | 12/2016 | Drake et al. |
| 2017/0332125 | A1 | 11/2017 | Panchaksharaiah et al. |
| 2017/0372749 | A1 | 12/2017 | Ramaswamy et al. |
| 2018/0310045 | A1 | 10/2018 | Panchaksharaiah et al. |

OTHER PUBLICATIONS

U.S. Appl. No. 15/599,385, Final Office Action dated Jan. 11, 2019, 14 pages.
U.S. Appl. No. 15/599,385, Office Action dated Jun. 11, 2019, 14 pages.
U.S. Appl. No. 15/599,385, Final Office Action dated Dec. 20, 2019, 17 pages.
U.S. Appl. No. 15/599,385, Office Action dated May 8, 2020, 16 pages.
U.S. Appl. No. 15/599,385, Office Action dated Oct. 19, 2020, 17 pages.
U.S. Appl. No. 15/599,385, Final Office Action dated May 5, 2021, 20 pages.
U.S. Appl. No. 15/599,385, Office Action dated Aug. 31, 2021, 20 pages.
U.S. Appl. No. 15/599,385, Final Office Action dated Apr. 1, 2022, 22 pages.
U.S. Appl. No. 15/599,385, Notice of Allowance dated Jul. 21, 2022, 14 pages.
European Patent Office Application Serial No. 18173044.1, Office Action dated Feb. 15, 2023, 6 pages.
European Patent Office Application Serial No. 18173044.1, Office Action dated Apr. 15, 2021, 6 pages.
European Patent Office Application Serial No. 18173044.1, Search Report dated Aug. 22, 2018, 8 pages.

* cited by examiner

THIS MATCH IS ALREADY IN PROGRESS. WE KEEP TRACK OF KEY PLAYS AND EXCITING MOMENTS FROM ALL OF THE ACTION YOU MISSED SO FAR.

Would you like to catch up on the match by watching just the key plays you missed? At the end of your catch up session, you will be taken to the live action.

YES, CATCH ME UP

NO, GO LIVE

FIG. 3

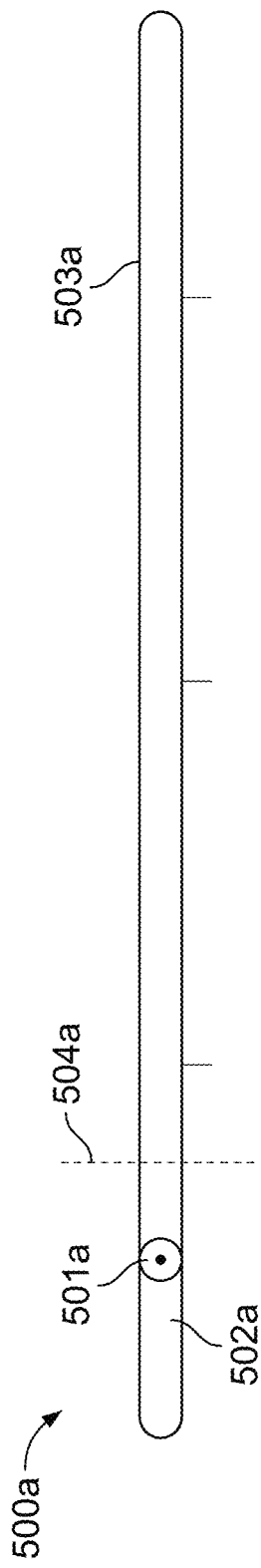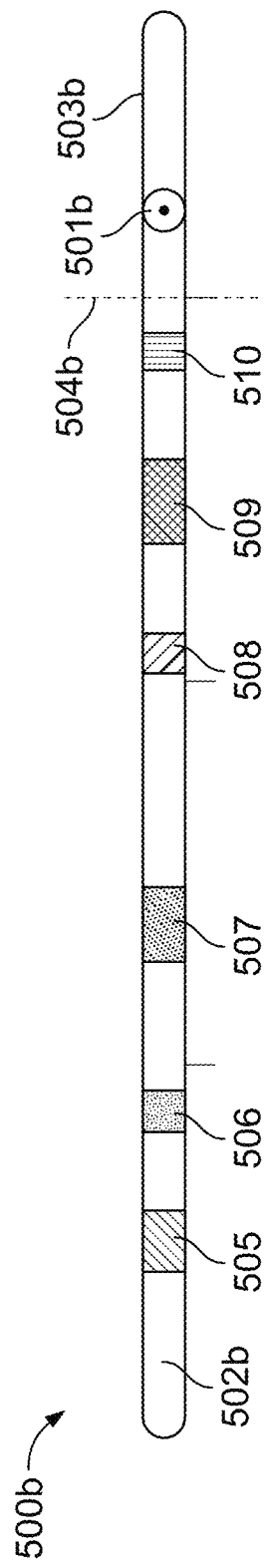
FIG. 5A
FIG. 5B

SYSTEM AND METHOD FOR PRESENTING CONTEXTUAL CLIPS FOR DISTRIBUTED CONTENT

CROSS-REFERENCE TO RELATED APPLICATIONS

This application is a continuation of U.S. patent application Ser. No. 15/599,385, filed on May 18, 2017, the contents of which are hereby incorporated by reference herein its entirety.

BACKGROUND

With the advancement of technology in the fields of content generation, storage, retrieval, distribution, and consumption, consumers are provided with ever-increasing avenues and platforms for consuming particular items of desired content. On-demand video and audio services as well as digital streaming services and content available on the Internet provide consumers with a large number of options.

However, the ability to consume content as it is broadcast or otherwise distributed in real time to the rest of the general population of consumers still holds immeasurable value to consumers, particularly in view of the increasing popularity of social media. The ability to consume content in real-time as it is distributed-along with the rest of the consuming public-allows consumers to participate in discussion about the content with other members of the consuming public, and this is further driven by the immediacy of information and social commentary available on social media platforms such as TWITTER, FACEBOOK, SNAPCHAT, and the like.

While participating in discussion about a particular piece of content in traditional forums-such as the fabled office water cooler-take place the day after a particular content is distributed, the same discussion in today's social media context is being held within seconds of the content being broadcast or otherwise distributed. In some cases, the discussion is immediate, as is the case with the example of "Live-Tweeting," where a user provides real-time commentary on the TWITTER social media platform for a particular live content item being broadcast, where the content, such as political election coverage, award shows, or live sporting events, often has a large numbers of simultaneous viewers.

Additionally, the desire for users to consume or experience content in a real-time setting is not driven only by discussion of that content. There is still a strong desire for consumers to consume or experience content in real-time as the content is being distributed simply for the sake of knowing the outcome or viewing the unfolding of a particular outcome, for example in the case of live sporting events. While tools such as digital video recorders allow users to view time-shifted content, users still run the risk of being exposed to spoilers, such as information via their smartphones, laptops, tablets, smart televisions, smart watches and devices, and the like, related to the content being broadcast before they have had a chance to watch and fully consume the content themselves. Thus, it is challenging for users to record broadcast content such as an important live sporting event, and not be exposed to spoiler information related to the score, plays, or significant events during the sporting event which may ruin the experience for the user.

In cases where the user is unable to make time to begin viewing live content exactly at the broadcast's start time, users are faced with the undesirable options of beginning to view the content starting from a mid-point of the content already underway (thus not knowing all the events which took place prior), or watching the entire content from a recording or other available medium, where the user then runs the risk of being inadvertently exposed to information which may ruin the content experience, such as spoiler information or final game score.

Thus, the existing systems and methods are unable to provide a solution for a user who wishes to view live broadcast or distribution content in real-time, but may need to begin viewing the content at a mid-point of the broadcast or distribution already underway, while also wanting to view or experience the events or content which took place prior to tuning in. Therefore, it may be advantageous for a system and method to present contextual content for the distributed content when a viewer begins viewing at a point during the live content already underway.

SUMMARY

Embodiments of the present disclosure include a system and method for presenting contextual clips for distributed content. In some embodiments, the content may not be broadcast or distributed live, and the user may simply join in on viewing the content during a time-delayed broadcast or distribution of the content. Contextual clips presented to the user may correspond to important or significant events or plays of the content. In some cases, the contextual clips may be clips that are necessary for the user to understand the background of the content at the current distribution time point. In other embodiments, the contextual clips may correspond to important events or highlights—such as for sporting events—that the user may wish to view prior to joining the current distribution time point.

In some embodiments, the user may select what type of criteria is used in identifying and selecting previous portions of the content to be displayed as contextual clips. In an embodiment, the user may select a desired total time length for playback of the contextual clips, and selection of the contextual clips may be based on the selected desired total time length. In other embodiments, the system may be configured to utilize one or multiple classification filters for identifying and selecting the contextual clips to be displayed.

An embodiment of a method of the present disclosure includes receiving an input for presenting content while the content is currently being distributed at a first time point within the content, transmitting a request for contextual content prior to the first time point, receiving information for displaying a plurality of contextual content clips distributed prior to the first time point, in which each of the plurality of contextual content clips corresponds to an event depicted in the content, displaying the plurality of contextual content clips using the received information, and displaying the content at a current distribution time point after all of the plurality of contextual content clips have been displayed.

A system according to an embodiment of the present disclosure may include a network communication unit configured to transmit and receive data, and one or more controllers configured to receive an input for presenting content while the content is currently being distributed at a first time point within the content, transmit a request, via the network communication unit, for contextual content prior to the first time point, receive information for displaying a plurality of contextual content clips distributed prior to the first time point, in which each of the plurality of contextual content clips corresponds to an event depicted in the content, display, via a display associated with the system, the plurality of contextual content clips using the received information, and display, via the display, the content at a current distribution time point after all of the plurality of contextual content clips have been displayed.

An apparatus for presenting contextual clips for distributed content according to an embodiment of the present disclosure may include means for receiving an input for presenting content while the content is currently being distributed at a first distribution time point within the content, means for transmitting a request for contextual content prior to the first time point, means for receiving information for displaying a plurality of contextual content clips distributed prior to the first time point, in which each of the plurality of contextual content clips corresponds to an event depicted in the content, means for displaying the plurality of contextual content clips using the received information, and means for displaying the content at a second distribution time point within the content after all of the plurality of contextual content clips have been displayed.

A computer-readable medium for presenting contextual clips for distributed content is provided. The computer-readable medium may include computer executable code. The computer-readable medium may include code to receive an input for presenting content while the content is currently being distributed at a first distribution time point within the content, to transmit a request for contextual content prior to the first time point, to receive information for displaying a plurality of contextual content clips distributed prior to the first time point, in which each of the plurality of contextual content clips corresponds to an event depicted in the content, to display the plurality of contextual content clips using the received information, and to display the content at a second distribution time point within the content after all of the plurality of contextual content clips have been displayed.

BRIEF DESCRIPTION OF THE DRAWINGS

The above and other aspects and features of the present disclosure will become more apparent upon consideration of the following description of embodiments, taken in conjunction with the accompanying drawing figures.

FIG. 3 is an illustration of a visual prompt screen displayed at the client terminal for distributed content according to an embodiment of the present disclosure.

FIGS. 5A and 5B are illustrations of examples of a timeline for distributed content and threshold times for displaying contextual clips according to embodiments of the present disclosure.

DETAILED DESCRIPTION

In the following detailed description, reference is made to the accompanying drawing figures which form a part hereof, and which show by way of illustration specific embodiments of the present invention. It is to be understood by those of ordinary skill in this technological field that other embodiments may be utilized, and that structural, electrical, as well as procedural changes may be made without departing from the scope of the present invention. Wherever possible, the same reference numbers will be used throughout the drawings to refer to the same or similar parts.

Embodiments of the present invention relate to a system and method for presenting contextual clips for distributed content. In this disclosure, the content will be discussed primarily with respect to live streaming video content distributed via data and Internet transmission protocols. The term "broadcast" and "distribution" will be used broadly to include various delivery methods of content, including air, cable, satellite, Internet, wireless, and other platforms known in the art, and shall not be limited to a particular technology or platform. Additionally, the terms "tune-in," "tune-out," and others will be used broadly to apply to any user activity turning on or turning off a particular piece of content across all platforms and distribution methods, and shall not be construed as limited to any particular technology platform or content distribution method. Further, various applications of the systems and methods disclosed herein to other media and distribution channels thereof are contemplated, including, but not limited to broadcast television via digital distribution transmissions and over the air broadcast formats, streaming audio and video applications, mobile audio and video streaming, radio, Internet radio, live virtual reality content, and the like. One of ordinary skill in the art will appreciate that this disclosure is not to be limited to this list, or the following discussion, and is applicable to various other formats, medium, platforms, and distribution channels known of those skilled in the art.

Figure 1:
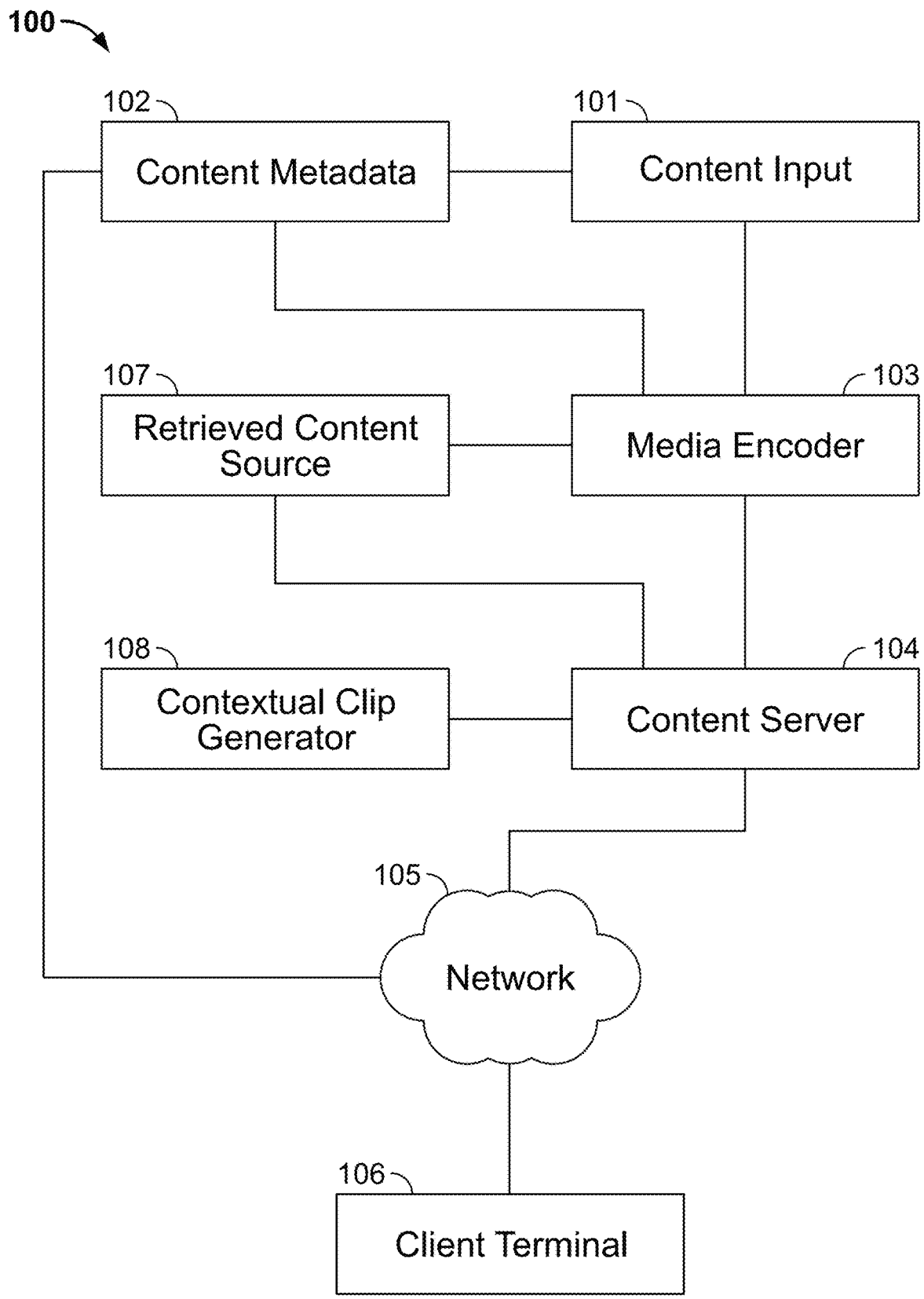
FIG. 1 is an illustration of a system for presenting contextual clips for distributed content in accordance with an embodiment of the present disclosure.

Referring to FIG. 1, an aspect of a system 100 for distributing content and contextual clips therefor is shown. The system 100 may be configured to generate, encode, distribute, and store data related to a live video stream, as well as receive and handle requests from a client terminal for presentation of contextual clips of the distributed content. FIG. 1 will be discussed with respect to a streaming video embodiment, such as the HTTP Live Streaming (HLS) format, MPEG DASH, and the like, however, this disclosure is not to be limited thereto, and it will be understood by those of ordinary skill in the art that the features discussed herein are applicable to numerous other applications, platforms, and content delivery methods well known of those of ordinary skill in the art.

The system 100 may include a content input 101 in which content is created and/or generated for encoding and distribution. The content input 101 may correspond to analog or digital video captured via one or more cameras during a live event, such as a sporting event, awards ceremony, political or social event coverage, and the like. The content 101 may be otherwise provided in other embodiments of the system 100 from various sources of video, including television broadcast, cable video distribution systems, satellite content distribution, Internet video, streaming video, mobile video distribution systems, digital video downloads, and the like. For the purposes of this discussion, an example of the content will be discussed as a live soccer match being distributed, however any type of content may be utilized for this disclosure.

The embodiment of the system 100 may further include a content metadata source 102 which creates, gathers, compiles, and/or provides metadata related to the soccer match for compilation and incorporation with the distributed content. For example, in the case of a soccer match, the metadata may be timecoded and correspond to data on particular plays of the game at each time point, such as goals scored, goal assists, penalties, free kicks, penalty kicks, corner kicks, yellow cards, red cards, player substitutions, player ejections, player injuries, coach ejections, and the like, along with information on the players or individuals involved with each type of event. In some embodiments, the metadata may be generated in real-time manually by a statistician or other responsible person watching and keeping track of the game events. The metadata may be entered into the system 100 with appropriate timecodes for each metadata entry. In some embodiments, the metadata may be provided by a third party tasked with processing, entering, and offering the metadata for query and/or retrieval. In certain cases, information from content input 101 may be utilized and input to the content metadata source 102 to generate metadata information, such as content markers, content delineation, and the like.

In the system 100, the content metadata source 102 and the content input 101 may be provided to a media encoder 103 which is configured to encode video files of the content along with encoded metadata of the content in various bitrates to be made available for streaming according to the HLS file formats. The media encoder 103 may be configured to perform data visualization or other presentation methods utilizing the content input 101, such as multiple camera views, as well as metadata of the content (or other types of content related data, not depicted) to generate audio and visual information which incorporate the separate components of information for a complete and seamless presentation to a user at the client terminal. In yet other embodiments, the content metadata 102 may be provided or made available for retrieval by components connected via a network 105, such as a client terminal 106, which may separately perform the above operations to generate and complete the content for presentation, as discussed further below.

In some embodiments, the encoded video files may correspond to commonly known compressed or uncompressed file formats including MPEG-1, MPEG-2, MPEG-4, H.264, AVC, DV, DVCAM, AVI, ASF, MOV, WMV, and the like, however the disclosure is not limited thereto and those of ordinary skill in the art will understand applicability to numerous other compressions and formats. The encoder may be configured to encode media content at various bit rates, or other variations of video and/or audio compression quality, and generate encodings for each quality level. The encoder may encode media content and cause the generated encoded files to be distributed by a content server 104.

The media encoder 103 may also be configured to cause encoded media files to be concurrently stored in a memory associated with the content server 104, or in some embodiments the media encoder 103 may also be configured to provide the encoded media files to be provided to a retrieved content source 107 where it may be stored for retrieval. In other embodiments, the encoded media files may be stored in a database external to the system, and the content server 104 or the retrieved content source 107 may be configured to store only pointers or path descriptions for querying and/or requesting the encoded media files from the external database for later retrieval.

In an example, the encoded media files may be stored in the retrieved content source 107 along with the timecoded metadata associated with the soccer match, and any other metadata associated with the media file, including encoding metadata, closed captioning information, timecoded graphics overlay information, timecoded graphical presentation metadata, and the like. In some embodiments, the retrieved content source 107 may also receive metadata directly from content metadata source 102 (not depicted), for association and storage with the encoded media files.

Returning to the content server 104 of the system 100, the content server 104 may include a plurality of content servers, each configured to handle requests for media files and to facilitate transmission of media files to requesting parties. As shown in the example shown in FIG. 1, the content server 104 may be in communication with a client terminal 106 via a network 105.

The content server 104 may be configured to receive requests from the client terminal 106 for media content, and provide information to the client terminal 106 in response to a request, including providing data associated with the encoded media content or address information for retrieving files of the encoded media content. It will be understood that content server 104 may be configured to provide information, data, and media content other than video, including audio, text, metadata, and the like, and embodiments of the disclosure are not limited.

For example, content server 104 may be an enterprise server, a web server, a media server, a mobile data server, or any other type of server. In some embodiments the content server 104 may be a computer or a computer program responsible for accepting requests (e.g., HTTP, RTSP, or other protocols that can initiate a media session) from client terminal 106 and serving client terminal 106 with streaming media. Although not shown in FIG. 1, embodiments are considered where the client terminal 106 is configured to transmit and receive data directly to and from a separate web server, which in turn transmits and receives data transmissions with the content server 104 via a network such as the network 105.

In some embodiments, the content server 104 may be configured to provide the client terminal 106 with one or more manifest data files which include information related to the encoded media content. The manifest data file may be provided to the client terminal 106 in response to a request for encoded media content. The manifest may include information on suggested bandwidths for each encoding level, a location where each encoding data file is available such as an address, link, or other pointer a location where the encoding file can be retrieved, and various metadata related to the encoded media content, such as event information, media type, aspect ratios, codec information, and the like. In some embodiments, the manifest may be provided in the form of an XML file, however various implementations and file types are considered which are well known to those of ordinary skill in the art.

The network 105 may include various systems for distribution of content including any desired combination of hardwired and wireless communication links, including wide area networks (WAN), local area networks (LAN), wireless networks suitable for packet-type communications, over-the-air, cable, Internet, other network connection systems, and the like, which implement networks and hardware known and used in the related art, including broadcast technologies, cable or satellite distribution systems, Internet protocol (IP), or other networked technologies, and the like, wherein examples of the content include live and recorded television, movies, Internet streaming video and audio, music, radio or other audio-visual content, and the like. The system 100 may also include a gateway (not depicted), for example a server, a router, a firewall server, a host, a proxy server, request redirector, and the like.

The client terminal 106 may be connected to the network 105. The client terminal 106 may be a hardware component including software code and applications which are configured to allow the client terminal to communicate, transmit, request, and receive data packets via the network 105 which may correspond to streaming media data. The client terminal 106 may include any terminal or system configured to receive a content signal, and in some embodiments, the client terminal 106 may be configured to decode received encoded media files and prepare the content for presentation to a user via an output such as a display, audio speaker, or the like. The output may be implemented in the same hardware as the client terminal 106, or in some embodiments, the output may be implemented in a separate hardware or location from the client terminal 106 and be otherwise coupled and/or associated with the client terminal, such as by wired connection or wireless communication.

For example, the client terminal 106 may correspond to an Internet video streaming device, which is configured to request, transmit, and receive data packets corresponding to Internet streaming video, and the client terminal may be further configured to decode received data packets and prepare the media content to be displayed via a separate output, such as a television. In some embodiments, the client terminal 106 may also be configured to transmit information to one or more other aspects of the system 100 via the network 105, or similar network, regarding the content data received and decoded by the client terminal 106. Various other embodiments of the client terminal 106 may include televisions, desktop computers, laptop computers, tablet computers, mobile smartphones, personal media devices, wearable devices, set top box receivers, streaming Internet content devices, satellite television receivers, and the like. In other embodiments, the client terminal 106 may be implemented in more than one connected device.

In an embodiment, the client terminal 106 may request, retrieve, and/or receive particular content from the content server 104 via the network 105. The request, retrieval, and/or the receiving of the particular content may correspond to a user of a client terminal selecting a particular broadcast, entering a particular URL or address at the client terminal, or utilizing a content provider-specific application which is configured to connect to content server 104 to transmit and receive instructions or requests for retrieval of specific content items. In some embodiments, the content server 104 may be configured to provide client terminal 106 with a single or multiple encoding streams of information, including audio/video content, as well as data associated with the audio/video content, such as metadata.

In some cases, the data may be incorporated into the audio/video content such that a single encoding stream may be provided to client terminal for presentation. In other embodiments, the client terminal 106 may communicate with a separate source for content metadata source 102 via network 105, including transmitting requests for particular metadata associated with content received from content server 104, and receiving the metadata directly at the client terminal 106. In such configurations, the client terminal 106 may be configured to decode multiple streams of content and data received separately from the content server 104 and the content metadata source 102 (or other types of data, not depicted), and to perform data visualization or other presentation methods utilizing the data to generate audio and visual information which incorporate the received separate encodings for a complete and seamless presentation to a user at the client terminal.

In an embodiment, the system 100 may also include a contextual clip generator 108 which is configured to identify, retrieve, generate, and/or transmit one or more contextual clips of the content being distributed. The contextual clip generator 108 may be implemented as a separate component in the system 100, and in some embodiments, the contextual clip generator may be implemented with another hardware or software aspect of the system 100, including content server 104, such embodiment not depicted in FIG. 1.

The contextual clip generator 108 maybe configured to receive a request from the client terminal 106 via the content server and/or network, requesting contextual content clips of the content currently being distributed to the client terminal 106 in real time, and the requested contextual content clips are to provide the user of client terminal 106 with clips of content which occurred prior to the current real-time point of content distribution. In other embodiments, the contextual clip generator 108 may be in communication with the client terminal 106 via network 105, and may receive requests for contextual clips from client terminal 106 without the request being transmitted to content server 104.

In yet other embodiments, the contextual clip generator 108 may automatically provide contextual clips in response to the client terminal 106 requesting encoded media files of the distributed content, in which the request for the content comes after the start time of the content distribution. In such an embodiment, the content server 104 may determine that the client terminal 106 is requesting encoded media files of the distributed content at a non-starting time, and trigger the contextual clip generator 108 via a message to identify and provide contextual clips for transmission to the client terminal 106 which occurred in the live event prior to the time of the client terminal's 106 request for content. In other embodiments, the contextual clip generator 108 may be implemented with the content server 104, and thus the contextual clip generator 108 may identify and retrieve the contextual clips automatically in response to the client terminal's 106 request for encoded media files.

The contextual clips may be encoded as separate files similar to the content being distributed. Similar to the content server 104, the contextual clip generator 108 may be configured to provide to the client terminal 106 with data about a location where the encoded file(s) for each contextual clip is available, such as an address, link, or other pointer a location where the encoded file(s) can be retrieved. In other embodiments, the contextual clip generator 108 may only provide the client terminal 106 with metadata including timestamp information corresponding to the distributed content. The timestamp information may include a range of timestamps for each contextual clip to be retrieved and displayed. In such an embodiment, the client terminal 106 may query the content server 104, or the retrieved content source 107 directly, for the encoded media files corresponding to the timestamp or the range of timestamps for decoding and display at the client terminal 106.

The client terminal 106 may also receive a data feed for processing and displaying graphics along with the video content of the decoded media files. The data feed may be provided by another aspect of the system 100 configured to receive input graphics information, or may be provided by an external component or by another party which generates and provides the data feed to the content server 104 or the client terminal 106. The displayed graphics may correspond to displayed features on the screen presented to the user alongside the live content, such as box scores for other soccer matches, graphic representations of the soccer pitch, graphic representations of player positioning, graphics for game stats, player card information, and the like. The information of the data feed may be timecoded, such that the client terminal 106 transmits a query with the current playback time position, and the data feed source provides the data feed appropriate for the particular playback time position indicated by the client terminal 106.

Since the contextual clips may not be continuous (e.g., the first clip may occur at 4:48 into the content, and the second clip may occur at 8:34 into the content, the client terminal 106 may be configured to transmit multiple ordered queries at once for encoded media files corresponding to multiple contextual clips, and the content server 104 may be configured to receive the multiple ordered queries and retrieve information for each contextual clip and to provide them to the client terminal 106 or successively to allow the client terminal 106 to buffer the non-continuous encoded media files.

Receiving the encoded media files, either from an address or link location or directly from the content server 104 or contextual clip generator 108, the client terminal 106 may decode the encoded media files of the contextual clips and provide the contextual clips for display at the client terminal 106, or at a display otherwise associated or connected with the client terminal 106. The request for the contextual clips may be transmitted to the content server 104 or contextual clip generator 108 in response to a user input specifically requesting the contextual clips (in some cases in response to a visual prompt, asking if the user would like to view contextual clips), or the request may be automatically generated at the client terminal 106 when the live content is tuned-in or turned on by the user.

In some embodiments, if the user tunes-in or turns on the live content at a time point of the content that is past a particular threshold time point (e.g., after a midpoint of the content), the client terminal 106 may automatically generate the request for contextual clips, or in other cases the client terminal 106 may simply display a visual prompt asking if the user would like to view the contextual clips. In other embodiments, if the user tunes-in or turns on the live content at a time point of the content that is prior to a particular threshold time point, no visual prompt may be displayed, or no request for contextual clips may be auto generated. In these cases, the time points of the content (which are prior to the particular threshold time point) may be too early in the live content for contextual clips to exist.

Figure 2:
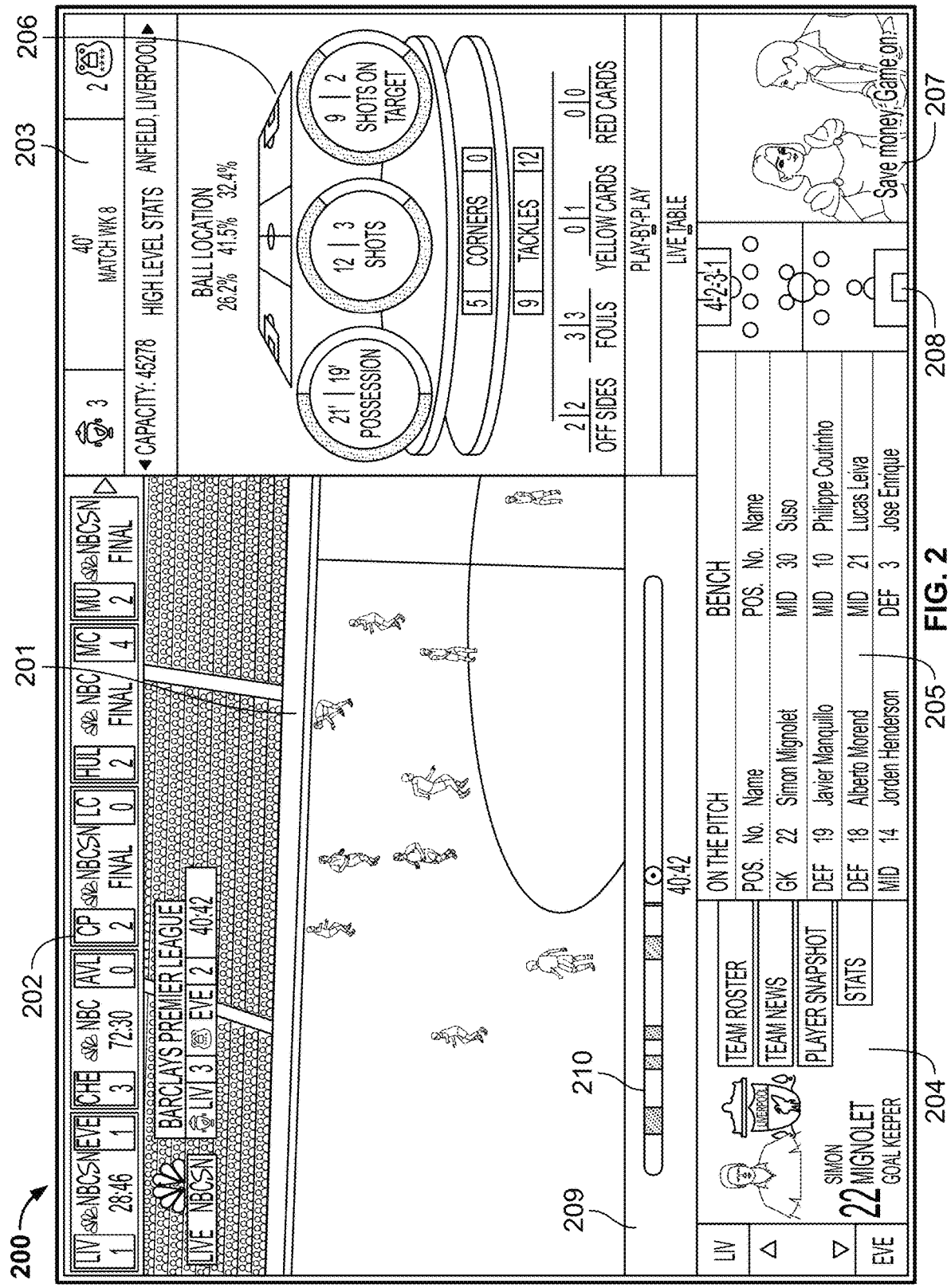
FIG. 2 is an illustration of a screen displayed at the client terminal for distributed content according to an embodiment of the present disclosure.

Referring now to FIG. 2, an example of a screen 200 displayed at a client terminal (e.g., the client terminal 106) is depicted when a user turns on live content already in progress without contextual clips displayed. As shown in FIG. 2, the client terminal may display the ongoing live soccer match in a playback region of the display 201, as well as graphical displays from the data feed such as box scores for other matches 202, current match and score information 203, player card graphical information 204, team roster information 205, graphical game stats information 206, advertising space 207, and graphical game representations 208.

The screen 200 or interface may also include a control region 209 including a displayed timeline 210 representing a progression of the current game's live content distribution. For example, in FIG. 2, the displayed timeline 210 represents that the user has tuned in at time 40:42 into the live content distribution. In some embodiments, the displayed timeline 210 may include indicators for significant events which have occurred during the game so far. These indicators may correspond to particular metadata entries in the content metadata which include information about particular important plays within the game, such as goals scored, penalties, shots on goal, and the like. However, if a user were to turn on this soccer match at this time point, the user would have to begin watching the game without knowing how goals were scored, and without having the context of how the match built up to this point in the contest.

Embodiments of the present disclosure include a client terminal which is able to present to the user contextual clips for viewing significant plays or events of the live content currently being distributed, so that a user can feel "caught up" with the content by the time the contextual clips are finished displaying, and the user is taken to viewing live content. The contextual clips may be displayed in the playback region of the display 201, or the contextual clips may be displayed full screen on a display of the client terminal.

The displayed graphical and related data such as the box scores 202, current match and score information 203, player card graphical information 204, team roster information 205, graphical stats 206, and advertising 207 may be retrieved by the client terminal, or the data may be provided to the client terminal in response to a query transmitted by the client terminal. In some embodiments, the query for displayed graphical information such as stats and box scores may include a time parameter which indicates the current time at the client terminal. A data source (not depicted in FIG. 1) of the system, or an external data source, may provide the graphical data items, or pointers and addresses for retrieval of the same, for the client terminal to receive the necessary graphical data for display which is appropriate and matched to the current time provided by the client terminal when live content is being displayed.

In some embodiments the time parameter of graphical data retrieved by the client terminal for display may not match a time parameter of content displayed at the client terminal, particularly where the client terminal is displaying contextual clips which correspond to previous playback positions of the content. In such event, the client terminal may be configured to compare a timestamp of a particular item of graphical data provided by a data source to ensure that it is not later in time than a current playback time within the displayed contextual data. For example, if a currently displayed contextual clip corresponds to a significant event which occurred at 2:00 pm, the client terminal may flag a graphical data item from the data source which corresponds to timestamp of 3:15 pm. This way the user is not presented with any information in the graphical data displays which might spoil the outcome of the currently displayed soccer match, such as box scores or game stats.

Additionally, for displayed box scores, embodiments of the client terminal may conduct an additional check to block the display of any graphical data item which relates to the content being currently displayed at the client terminal. Thus, a box score graphic for the same soccer match will not be displayed, regardless of time, during display of contextual clips of the same soccer match while the user is trying to catch up on the match's plays and events. In other embodiments, the client terminal may be configured to block various different types of graphical display items based on a variety of factors, including blocking any box scores or stats related to a same sport (no soccer scores or stats are displayed while contextual clips for soccer is displayed), or blocking any box scores or stats for any events which occurred on the same day, to avoid any possibility of ruining any sporting event or distributed live content in case the user wishes to experience the content at a later time.

Referring now to FIG. 3, an example of a screen 300 displayed at the client terminal is depicted where a visual prompt 301 is displayed to request user preference for displaying contextual clips of the live soccer match already in progress. When the user turns on the live content already in progress, the client terminal may determine that the soccer match is already underway and display visual prompt 301. The visual prompt 301 may indicate to the user that the match is already underway and present an option 302 for either displaying contextual clips of the soccer match up until the current live time point, or another option 303 for jumping straight into the live content and skipping the contextual clips. The visual prompt 301 may be displayed to obscure the score or any other details of the live soccer match displayed in the background, and the video of the soccer match in the background may be frozen and a static image displayed. In other embodiments, the background image of the soccer match may not be displayed at all to avoid providing any indicators or spoilers of the status of the match to the user who is viewing the match for the first time.

If the user selects the option 302 to display contextual clips which have already taken place, the client terminal may generate and/or transmit a query or request to the content server or the contextual clip generator, as discussed with respect to FIG. 1, for contextual clips leading up to the current live time point of the match. The request may include an indicator of a current live timestamp within the game, or the content server may use the current time point of the game derived from the metadata of the encoded media files currently being distributed.

The contextual clip generator may retrieve information of all events of the live event that are of interest and which should be shown to the user as a contextual clip. As discussed, this may be based on metadata received from the content metadata source, for example a metadata stream related to events within the soccer match which in some embodiments is provided by another party responsible for tracking game events and entering in descriptive metadata.

Figure 4A:
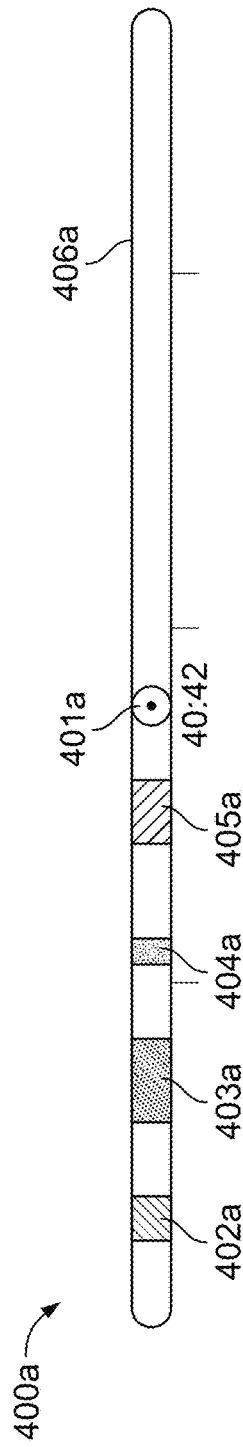
FIGS. 4A, 4B, and 4C are illustrations of examples of a timeline for distributed content and contextual clips according to embodiments of the present disclosure.

Referring to FIG. 4A, an illustration of a timeline 400a for the live soccer match is shown. The user may turn on the soccer match at the current time within the match 401 of 40 minutes and 42 seconds (40:42) into the match. On the timeline 400a, the remaining expected time for the live soccer match is shown at 406a. If a goal is scored at a time point within the match at 401a on the timeline, the metadata will include a timecoded entry for a goal scored, associated with the particular time within the match. The metadata entry may also include other specific information such as name of the player who scored the goal, the position on the pitch from where he/she scored the goal, whether the goal was from a corner kick, penalty kick, or free kick, and the like.

FIG. 4A shows that in addition to a goal scored at 401a, additional significant events occurred on the timeline at 403a, 404a, and 405a, all which occurred prior to the tune-in time of the user. As discussed, metadata related to the events 402a, 403a, 404a, 405a may have been entered and correspond to different types of events, other than a scored goal. The events 402a, 403a, 404a, 405a may be identified by the contextual clip generator by searching for particular metadata tag(s) of interest to give the user a complete context of the match so far, such as tags for "goal scored", "goal assist", "yellow card", or "red card".

In other embodiments, the metadata of the event may be tagged with a rating score to indicate the event's importance to the overall match outcome or to indicate an interest level for a user to view the event as a contextual clip. For example, metadata related to two different saves by a goalie may carry the same metadata tag of "saved shot on goal." However, one of the saves may have been a routine catch by the goalie, while the other save may have been a spectacular highlight-level play which a user would want to view as a contextual clip, despite the end result (and metadata) being the same as the routine save play.

Thus in some embodiments, the second save event may be entered with a rating score of 9 (out of a maximum value of 10)—or other rating/grading scale or system—while the metadata of the routine save play may be entered with a rating score of 2. The rating score may be added to the metadata at a later point after the initial entry of the metadata information. As an example, the metadata of the actual event may be entered by a data entry scorekeeper during the soccer game, and the additional rating score may be entered once the metadata is received at the encoder or the content server. In such embodiments, the contextual clip generator may search for all metadata tags having a rating score over a certain threshold value, such as 6, to identify all of the significant or interesting plays for generating the most pertinent contextual clips for the user.

In other embodiments, the identification of the significant events for contextual clips may be determined via other available data associated with the game. For example, social media data may be aggregated and correlated with the timeline of the soccer match to determine high points of interest indicated by an increased discussion of the match among social media users. In the case of a social media platform such as TWITTER, an identifying hashtag may be used to aggregate all social media activity related to the particular soccer match, and the activity may be compiled, normalized, and graphed to track sudden changes in TWITTER activity related to the identifying hashtag, otherwise referred to as "social velocity." A timestamp associated with the peak in activity may be correlated to a time point within the soccer match to determine that an event of great interest to social media users has occurred.

In the above example of the spectacular goalie save, viewers of the live soccer match who are also tweeting about the game on TWITTER may turn to the social media platform to describe or discuss the great play immediately after it occurs, using a hashtag to inform other users which soccer match they are referring to (e.g., "WOW !! Save of the Year !! #LIVvsEVE"—referring to the example match shown in FIG. 2). Using this hashtag, or combination of multiple similar hashtags, the contextual clip generator may detect that a significant increase in traffic has occurred at the time point in the match when the save occurred, which is further specifically identified by the content metadata matched with the time point. In other examples, the contextual clip generator may identify a particular time point or multiple time points (in some cases incorporating a predicted delay time period from the time the users viewed the event to the time an average user generates a tweet) to identify a range of time points within the content without relying on the match metadata. The contextual clip generator may be configured to store the metadata or time points for later retrieval, or cause metadata to be generated (or modified with a higher rating score) and associated with the identified event.

In other embodiments, significant events of the game may be identified for contextual clips directly by user input to the system, or other related input method. For example, the client terminal may be configured to receive specific inputs from the user to input a marker to indicate that a particular event of great interest to the user has occurred. This may simply correspond to an event which may be significant to the broader audience (such as a goal scored or spectacular goal save play), or it may be a particular event or displayed content which is of great interest specific to the user (for example, if the user's favorite player is shown on the screen, or the content discusses details about the player that is of interest to the user). In other embodiments, the user input data may include negative feedback (such as a thumbs-down input), to indicate that the user does not like the content at the particular time point.

The user generated data regarding the significant event (or negatively rated event) may be transmitted to the content server, contextual clip generator, retrieved content source, or the like, and a data record may be generated for the user generated input indicating a significant event. The user generated data may then be aggregated with data generated by the total users viewing the same content, and particular trends or spikes in user input with regard to time points within the content, or matched up with game information from the content metadata may be used to identify and mark a new significant event for generation of a contextual clip.

In some cases, the user generated data (for example related to their favorite player), may be stored at a database in a memory of the system which stores profile information for the particular user, identified by a unique identifier, associated with the user, or in some cases associated with the client terminal. The database may store and keep track of all input information from the particular user, such that a profile may be constructed which includes or facilitates learning of the user's preferences over time. This information may be used by the contextual clip generator to identify which events or clips of the game the particular user may want to view when generating contextual clips of a game in the future. In such embodiments, the client terminal may use log-in information entered at the client terminal to identify the particular user viewing the content in order to retrieve user generated input history or stored profile information.

In yet other embodiments, determining a significant event for a contextual clip within the soccer match may be based on the video or audio content itself. As discussed, metadata indicating a type of each play of the soccer match may fail to provide any additional detail on a level of excitement or interest in a particular play (e.g., routine goal save vs. spectacular goal save). Thus in some embodiments, the system 100 may analyze the video, audio, or text associated with the live content in order to detect and identify significant events.

For example, the contextual clip generator may analyze the audio for sudden increases in volume or pitch of an announcer's voice which may indicate that an exciting play has just occurred at that time point. In another example, the contextual clip generator may analyze the closed captioning information (or text obtained via voice recognition information of the audio) to detect a change in tone or increased use of superlatives used by the announcers of the match, which may indicate that the announcers are describing a particularly exciting or spectacular play. In another example, the contextual clip generator may analyze the video to detect an increased use of slow motion replay, or a repeated replay of a particular piece of video within a short period of time at a particular time point of the content, which may indicate that an important or impressive play has taken place, thus calling for repeated replays to a viewer. This information may be correlated with the match metadata to identify plays within the match that should be included as a contextual clip for the user.

The above examples are not to be limiting. Further it is considered that the system 100 includes additional separate or combined aspects configured to perform the tasks described above with respect to analyzing and processing video, audio, and/or text, or where the analyzed data is received by the system 100 by an external system or party.

Figure 4B:
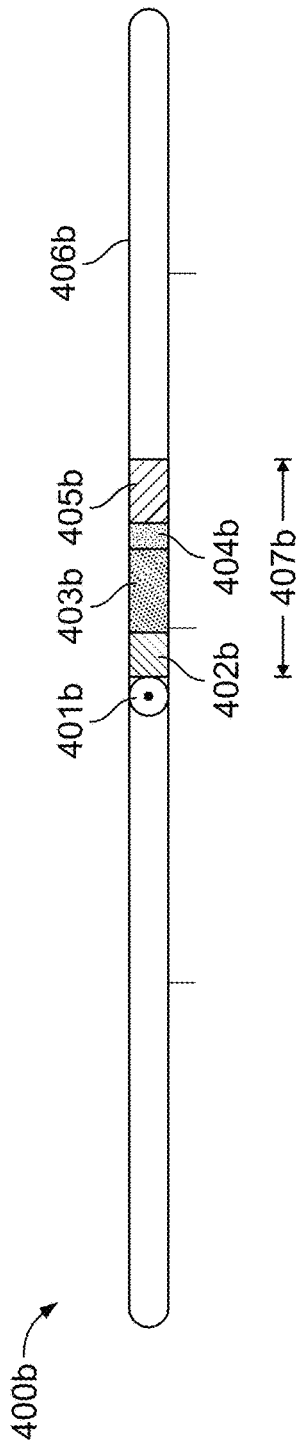

Referring now to FIG. 4B, a modified timeline is shown which represents a playback order of the identified contextual clips 402b, 403b, 404b, 405b as identified in 4A, and the live content 406b following the contextual clips. The contextual clips are presented to the user in order to provide the user with background on the progression of the soccer match thus far. As the user is viewing the compiled contextual clips, the live soccer match continues for the duration of the contextual clips.

In some embodiments, the client terminal will display the compiled contextual clips 402b, 403b, 404b, 405b, and then immediately will display the live soccer match that is ongoing 406b at a current distribution time point. Thus, the time point at which the user will begin to view live content 406b (at the end of the contextual clips viewing period 407b), will be later in time than the initial time point at which the user turned on the live content for viewing (401a of FIG. 4A). In other embodiments, the client terminal or other aspects of the system may be configured to begin recording the live content 406a beginning from time point 401a as soon as the user requests display of the contextual clips, and store the recorded live content 406a to a memory, either at the client terminal or otherwise in communication with the client terminal via the network. Once the user has been presented with all contextual clips at the end of 407b, the client terminal may begin displaying the recorded live content 406a stored in the memory such that the time point within the content at which the user requests contextual clips is the time point within the content is that is presented immediately after the contextual clips are completed being displayed, and the user does not miss any of the content due to requesting the contextual clips.

Figure 4C:
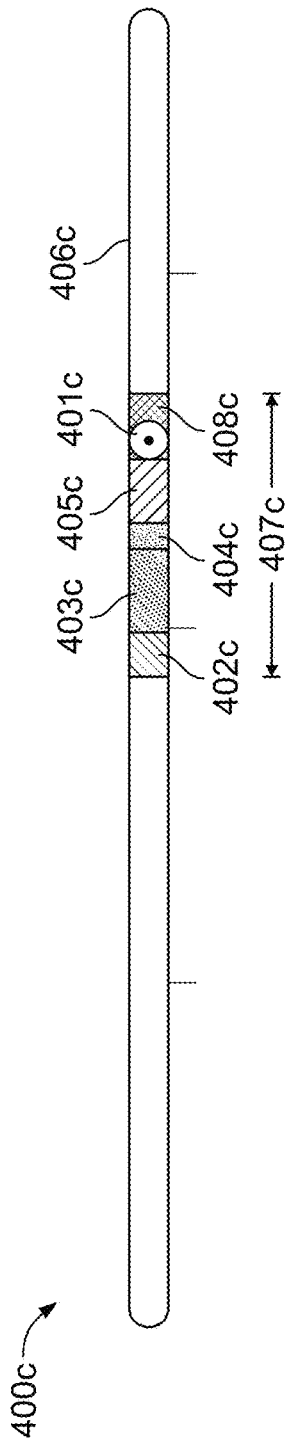

The recording and delaying of the remaining live content 406a may be advantageous in that the user does not miss any additional plays of the content, but it results in the user's viewing of the entire remainder of the live content 406a being delayed by the amount of time it takes to view the contextual clips (equivalent to the time length of 407b). Therefore, in another embodiment, the system may be configured to keep track of any additional contextual clips during 407b, and present them to the user such that the user can be taken directly to live content 406b. For example, during the course of time period 407b, additional significant events of the live soccer match may occur. In such case, the additional significant event will be determined by the metadata of the match, or other detection methods as discussed above. As shown in FIG. 4C, once a playback position 401c reaches the end of 407b, a contextual clip 408c corresponding to the additional significant event may be appended to the time period for contextual clip viewing 407b to allow the user to view the additional significant event which occurred while the previous contextual clips were being viewed. In such case, the time period for viewing the contextual clips is extended (407c from 407b), and the time point at which the user is presented with the live soccer match 406c is delayed by an additional time (to the end of 407c) to display the additional contextual clip 408c.

In an embodiment, the extension of the time period for viewing the contextual clips may be continued until no additional contextual clips remain, and the client terminal is able to return to displaying live content being distributed in real time 406c. The client terminal may be configured to generate and transmit another request for any additional contextual clips during the playback of the initial contextual clips 402b-405b, or the contextual clip generator or the content server may be configured to automatically check for any additional significant events which may have occurred during the display of the initial contextual clips 402b-405b, and to provide the additional contextual clips to the client terminal for appending to the time period for contextual clip viewing 407b as discussed above.

Referring now to FIGS. 5A and 5B, illustrations of playback timelines are shown for conditions required for displaying contextual clips according to embodiments of the present disclosure. In FIG. 5A, the user has turned on the live content at time point 501a. However, as the time point 501a is relatively early in the live content, no significant events have occurred so far in the soccer match, shown by 502a, and thus no contextual clips are available for display by the client terminal. In some embodiments, the contextual clip generator may return a message to the client terminal that no contextual clips are available, and the client terminal may display a visual indicator to the user that no clips are available, or in some embodiments the visual prompt requesting the user's instruction will simply not be displayed and the user will be taken directly to live content being distributed in real time 503a.

In other embodiments, the system 100 may be configured with a predefined start threshold position 504a which indicates a threshold time point that the current playback position must be past in order for contextual clips to be shown. This may be predefined independently from the actual existence of contextual clips. In other embodiments, various configuration combinations may be implemented, such as where a visual prompt may be shown if the current playback position 501a is not past the start threshold position 504a, but contextual clips are shown automatically without a visual prompt if the current playback position 501a is past the start threshold position 504a. The client terminal may be provided with the start threshold position 504a, for example in the manifest information, such that the client terminal may not generate or transmit any requests for contextual data if the start threshold requirements are not satisfied.

Referring to FIG. 5B, a timeline is shown where the current playback position 501b is far long within the live content timeline, such that multiple contextual clips corresponding to significant events 505, 506, 507, 508, 509, 510 have been identified during the soccer match as it has occurred thus far, shown by 502b. However, since the current playback position is so far along the timeline of the live content, displaying all of the contextual clips 505-510 would result in the live content distribution coming to an end before the display of the contextual clips is completed. In this case, the user would then be presented with no live content after viewing the contextual clips.

Thus in some embodiments, an end threshold position 504b may be predefined to indicate a position on the timeline that the current playback position 501b cannot be past if contextual clips are to be shown. In such embodiments, if the current playback position 501b is past the end threshold position 504b, the visual prompt may not be shown and the user may be taken directly to live content being distributed 503b. The client terminal may be provided with the end threshold position 504b, for example in the manifest information, such that the client terminal may not generate or transmit any requests for contextual data if the end threshold requirements are not satisfied.

In other embodiments, if the current playback position 501b is past the end threshold position 504b, the client terminal may still display the contextual clips 505-510 as discussed in the embodiments above, and the client terminal may display the remaining content 503b on a delay to the user following display of the contextual clips. In other words, the remaining live content 503b at the time of the request for contextual clips may be delayed and appended to the contextual clips 505-510 displayed at the client terminal. The client terminal may be configured to display a visual prompt requesting user input for displaying the contextual clips, even if the remaining live content 503b is to be displayed on a delayed timeline.

Figure 6:
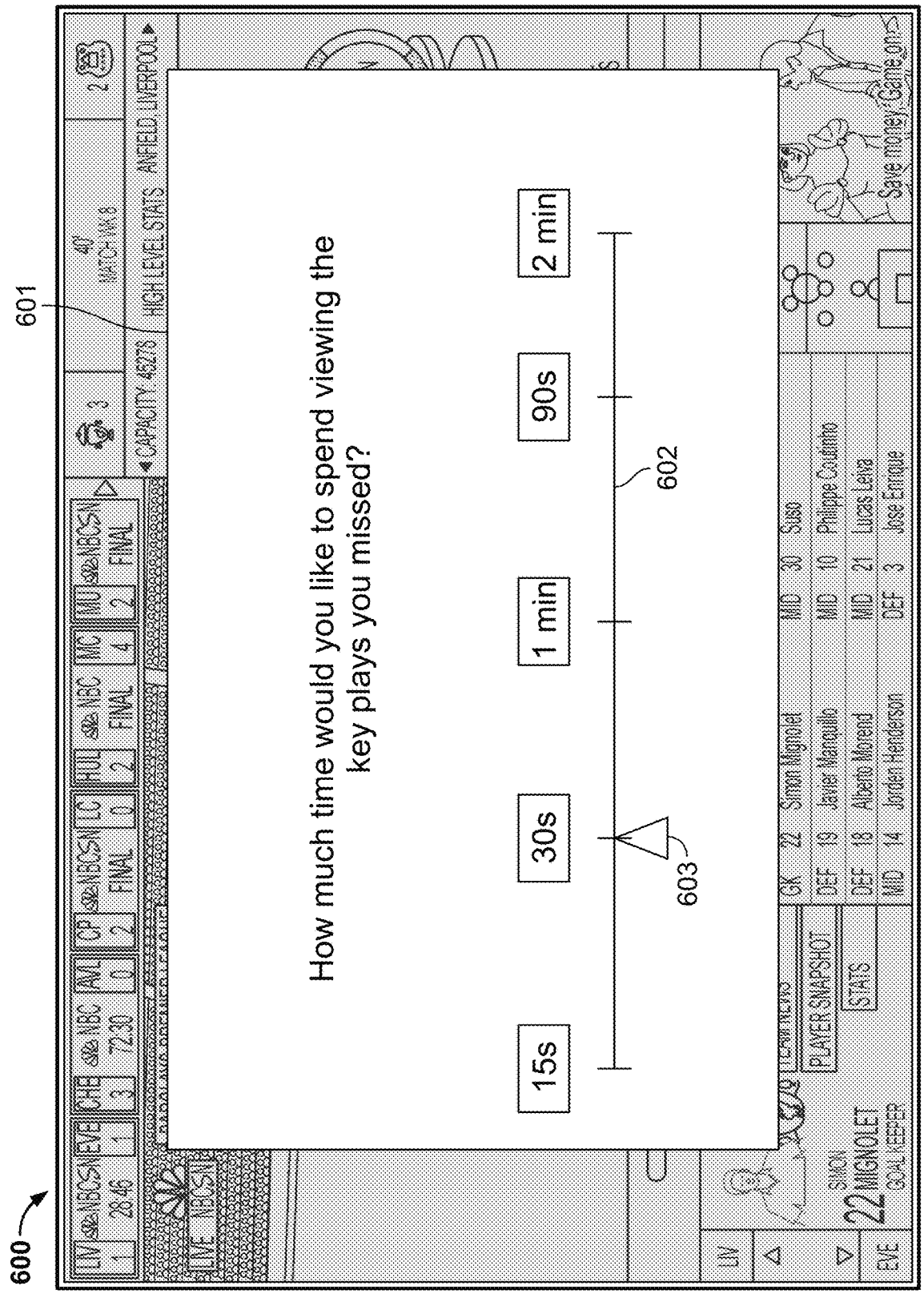
FIG. 6 is an illustration of a customizing visual prompt screen displayed at the client terminal for distributed content according to an embodiment of the present disclosure.

Referring now to FIG. 6, an embodiment of a screen 600 displayed at the client terminal is shown which includes a visual prompt 601 for an input indicating the length of time 602 the contextual clips are to be shown. If a user only wishes to view contextual clips for a very short amount of time (e.g., 30 seconds), the user may input a time length value to the user interface of the visual prompt. The user may select other options for the time length, including 1 minute, 90 seconds, 2 minutes, and so on. The visual prompt may include a field for manual entry of time, or may include a graphical slider interface 603 as shown in FIG. 6, or other type of data input interface. In response to the entry of time length, the client terminal may generate and transmit a request for contextual clips which includes the time length parameter.

The contextual clips generator may receive the time length parameter and identify and select contextual clips such that a total time of the clips meets the parameter requirements of the desired time length. In some embodiments, the contextual clips generator may be configured to expand or contract the time range for specific significant events in order to fit to the desired time length. This would not increase or decrease the number of clips displayed, but would only modify the length of each clip.

Figure 7:
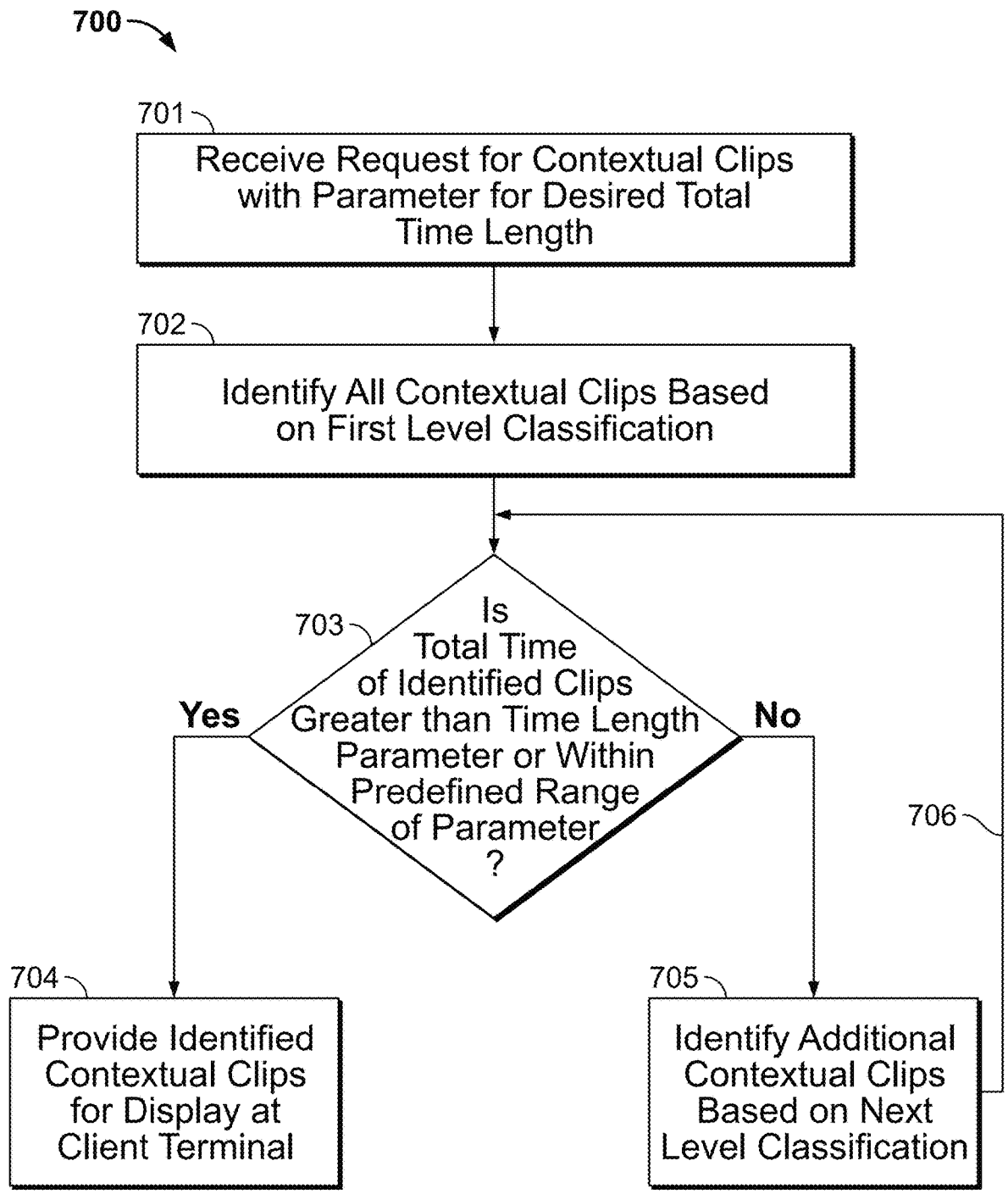
FIG. 7 is a flowchart depicting a method of identifying contextual clips according to an embodiment of the present disclosure.

In other embodiments, the contextual clips generator may be configured to iterate through various selection methods until a desired total length of the clips is reached. FIG. 7 is an example of a process performed by an embodiment of the contextual clips generator to identify and select contextual clips when a desired time length parameter is received. Referring to FIG. 7, when a request for contextual clips is received with a desired total time length parameter at 701, the contextual clip generator may select clips of all significant events of the soccer match based on a first level classification at 702. For example, the first level classification may correspond to the top priority events of the soccer match, e.g., goals scored. Therefore, the contextual clips generator may identify all contextual clips tagged with metadata associated with a goal scored.

After identifying all available contextual clips meeting the first level classification, the contextual clips generator may determine at 703 whether a total time of all identified contextual clips meeting the first level classification is within a predefined range of the time length parameter or is greater than the time length parameter. If the determination is yes, the contextual clips generator may determine at 704 that the selected clips sufficiently meet the desired time length parameter and provides information of the contextual clips for display at the client terminal. In the case where the total time length is greater than the desired total time length parameter, the contextual clips generator may take additional steps, to pare down the selections, for example by filtering out certain clips which fall below a particular rating score level or which fall outside of a preset user preference (for example, for a particular team or player).

If the total time length of the identified contextual clips is not determined to be greater than the desired total time length parameter and is not within a predefined range of the parameter at block 703, the contextual clips generator may search for additional clips using a next level classification at 705. Following the example above, a next level classification in importance following "goals scored" may be a search for clips tagged with metadata associated with "shot on goal." Once the additional clips are identified, the process returns at 706 to compare the total time length of all identified clips with the time length parameter 703. If the determination is again "No," a next level classification is again used to identify additional clips, for example clips associated with a metadata tag of "penalty kick." This process is repeated until a total time length of identified contextual clips satisfies the desired time length parameter, and, at 704, the information for the contextual clips is provided to the client terminal for display to the user.

Figure 8:
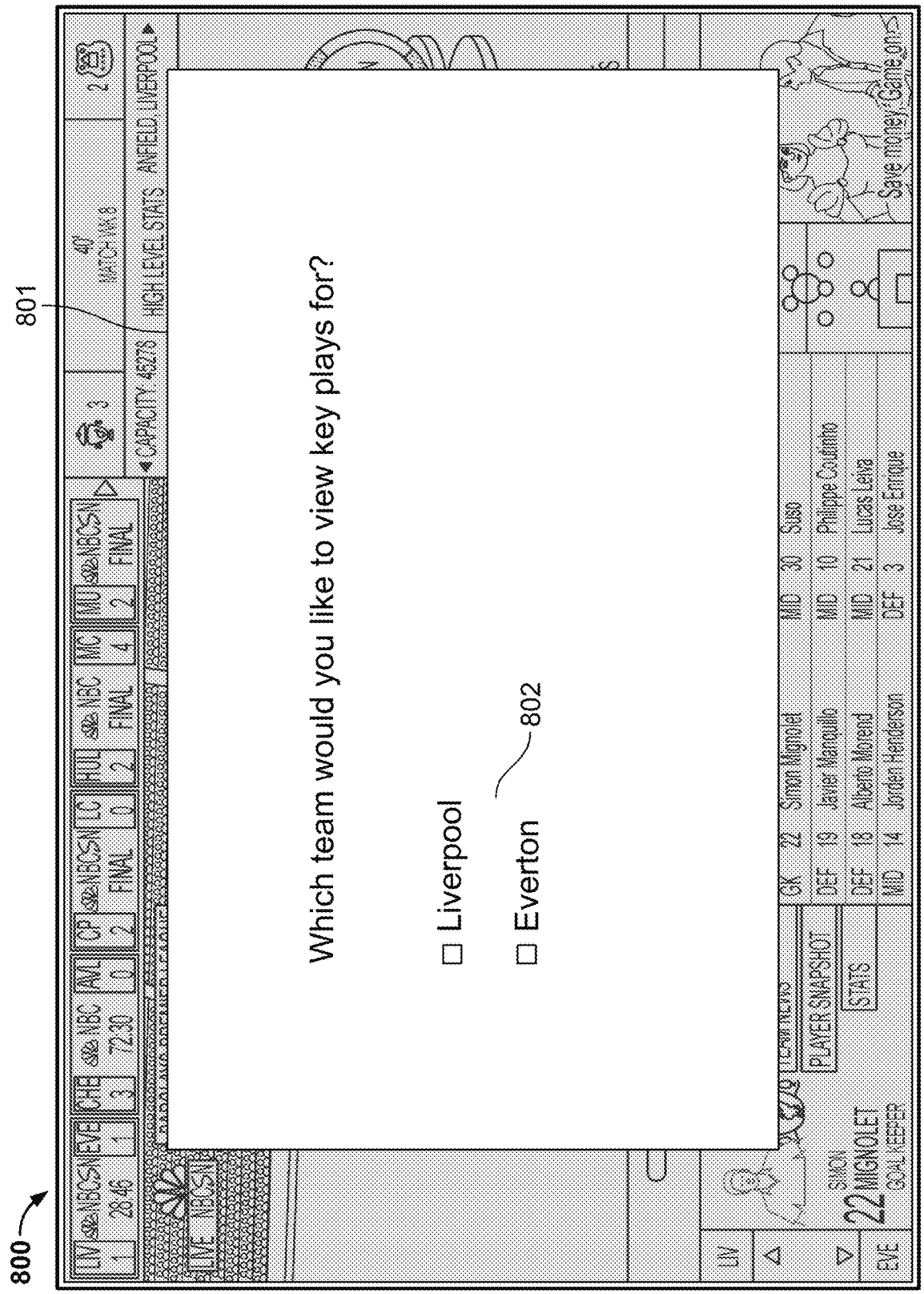
FIGS. 8 and 9 are illustrations of customizing visual prompt screens displayed at the client terminal for distributed content according to embodiments of the present disclosure.

Referring now to FIG. 8, a screen 800 displayed by a client terminal of an embodiment of the system is shown. As shown in FIG. 8, the client terminal may display visual prompt 801 to allow the user to further customize his/her preferences for the display of contextual clips. In response to a selection of a particular team 802 in the visual prompt 801 of FIG. 8, the client terminal may transmit a request for contextual clips to the contextual clip generator which includes a preferred team parameter. An embodiment of the contextual clip generator may utilize the preferred team parameter to select particular contextual clips corresponding to significant events in the soccer match which relate to the preferred team indicated by the user. In the example of FIG. 7, the preferred team parameter may be used as the first level or next level classification, or it may be used to pare down the identified contextual clips if a total time length of identified clips is greater than the desired total time length parameter, as discussed above.

Figure 9:
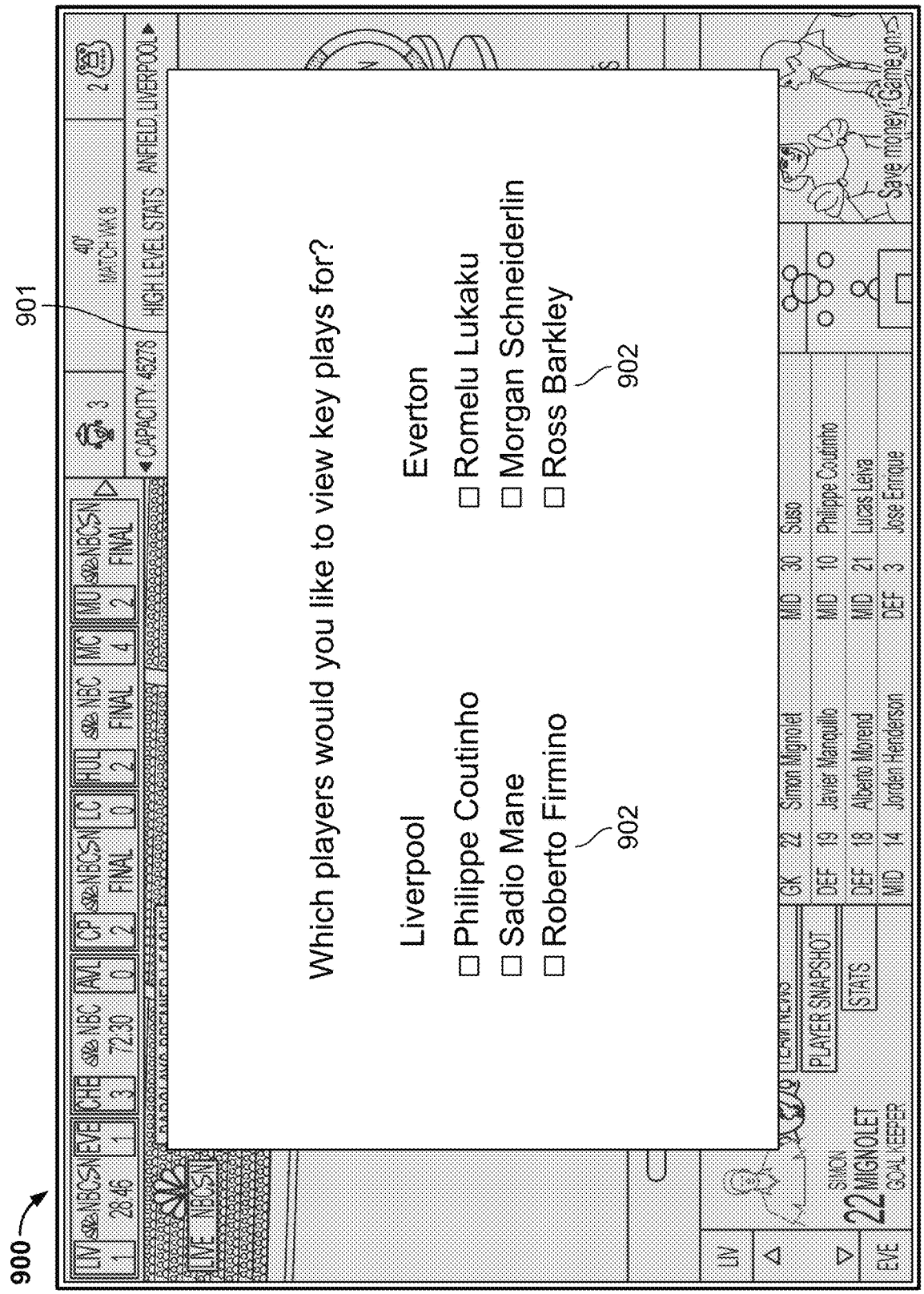

Referring now to FIG. 9, another screen 900 displayed by a client terminal of an embodiment of the system is shown. As shown in FIG. 9, the client terminal may display visual prompt 901 to allow the user to further customize his/her preferences for the display of contextual clips. In response to a selection of one or more players 902 from the relevant teams in the visual prompt 901 of FIG. 9, the client terminal may transmit a request for contextual clips to the contextual clip generator which includes preferred player parameter values. Similar to the FIG. 8 discussion, an embodiment of the contextual clip generator may utilize the preferred player parameter values to select particular contextual clips corresponding to significant events in the soccer match which relate to the preferred players indicated by the user. In the example of FIG. 7, the preferred player parameter values may be used as the first level or next level classification, or it may be used to pare down the identified contextual clips if a total time length of identified clips is greater than the desired total time length parameter, as discussed above.

The embodiments of user customization provided above are only provided by way of example, and it will be appreciated that this disclosure contemplates numerous other customizing options for the contextual clips to be displayed. For example, the user may further be asked to input particular preferred types of plays or events, in-game or out-of-game highlights, clips associated with non-play metadata such as clips of specific player close-ups, plays taking place in a particular location on the pitch/field of play, and the like.

Additionally, the client terminal or other aspects of the system of an embodiment of the present disclosure may also be configured to predict a user preference for the selection of contextual clips for display. For example, where it is determined that a particular user resides in a geographic location that is predominantly made up of fans of Liverpool Football Club, the client terminal and/or the contextual clip generator may set a predicted preference for that particular team (for example in FIG. 8), or may apply a weighted value toward the particular team when making a selection between two or more candidate contextual clips available for display. In yet other embodiments, other available information about the user such as demographics, social media profiles, user profile settings, and the like, may be used for a developing a predictive model for selection of contextual clips that may be preferred by the user.

The client terminal and/or the contextual clip generator may further compile historical data regarding the user's viewing activities, habits, and preferences in order to build and continually improve the predictive model for selecting contextual clips for the user. The predictive model may also utilize data of other users of the system, where similarities in data points between the user and aggregated data of groups of users may be drawn in order to apply weighted values and inferences for the predictive model.

Further, while the above examples were discussed in relation to a soccer match, this disclosure may be applied to various sports content, for example, to all other types of sports including but not limited to baseball, hockey, basketball, football, tennis, golf, and the like. Additionally, this disclosure may be applied to various non-sports related content, including live awards show ceremonies, political events, news coverage content, interview or talk shows, television programs, movies, virtual reality content, and the like. Thus, it will be understood by one of ordinary skill in the art that the features discussed above are applicable to various formats, content, and platforms, and are not limited to the examples discussed herein.

Figure 10:
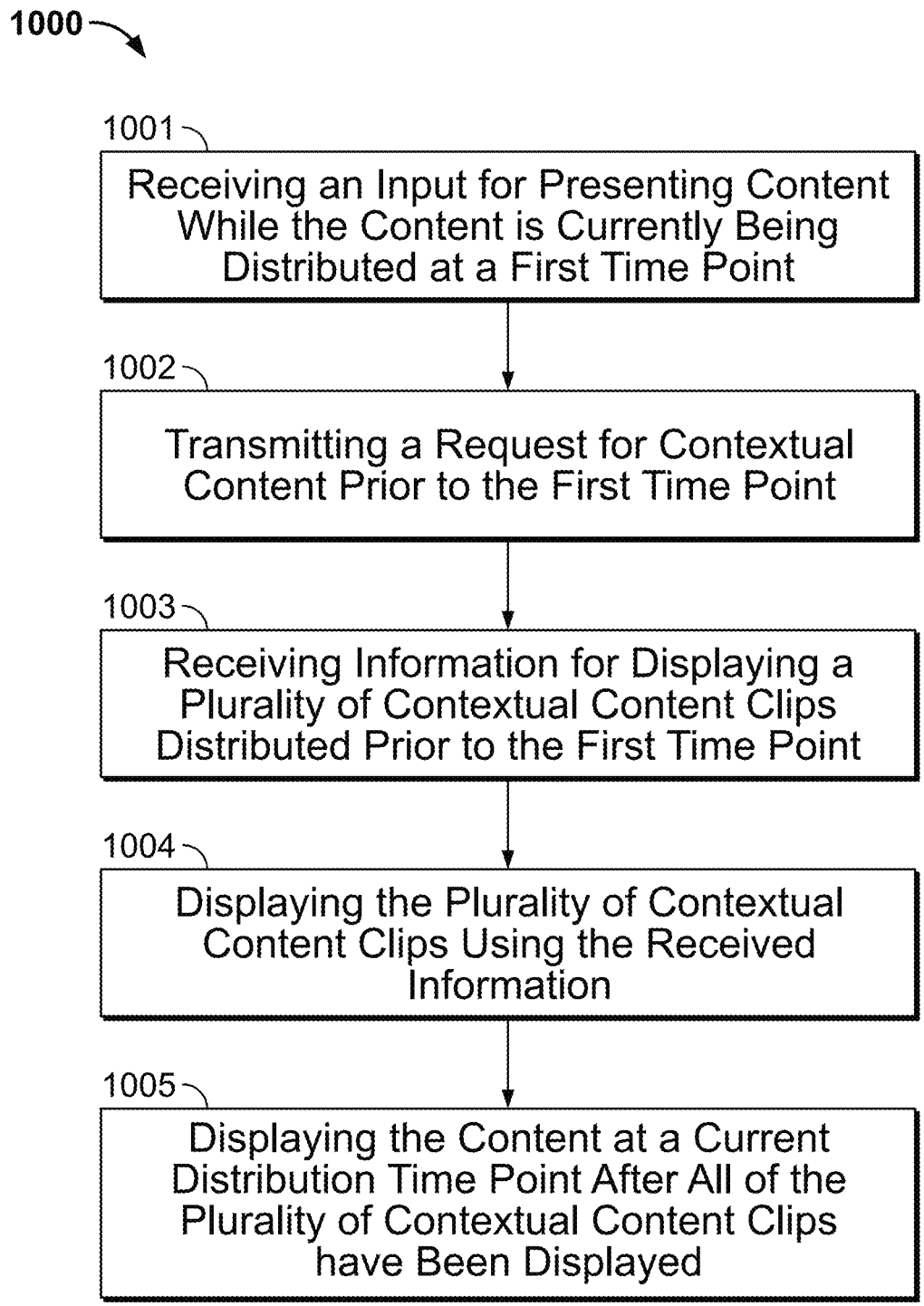
FIG. 10 is a method of presenting contextual clips for distributed content in accordance with an embodiment of the present disclosure.

Referring now to FIG. 10, a method 1000 of presenting contextual clips for distributed content according to one embodiment of the present disclosure will be discussed. The method may include, at block 1001, receiving an input for presenting content while the content is currently being distributed at a first time point within the content. For example, referring to FIGS. 3 and 4A, the client terminal (e.g., 106 in FIG. 1) may be configured to receive an input from the user for displaying contextual clips while the soccer match is currently being distributed at a first time point within the soccer match (e.g., at time point 401a)." In another example, the client terminal may be configured to receive an input for displaying contextual clips when the user tunes-in or turns-on the client terminal to a live sporting event already underway. Thus, in some examples, the input received by the client terminal may not be a user-generated input specific to a request for contextual clips and instead may be generated based on other actions at the client terminal.

At block 1002, the method may include transmitting a request for contextual content prior to the first time point at block 1002. For example, referring to FIG. 1, the client terminal may be configured to transmit a request to the contextual clip generator requesting contextual content clips of the content currently being distributed to the client terminal.

At block 1003, the method may include receiving information for displaying a plurality of contextual content clips distributed prior to the first time point. Each of the plurality of contextual content clips may correspond to an event depicted in the content. For example, referring again to FIG. 1, the client terminal may be configured to receive data from the contextual clip generator about a location where the encoded file(s) for each contextual clip is available, such as an address, link, or other pointer a location where the encoded file(s) can be retrieved.

At block 1004, the method may include displaying the plurality of contextual content clips using the received information. For example, referring to FIG. 4B, the contextual content clips, corresponding to events which have already taken place in a live sporting event such as a soccer match, may be displayed.

At block 1005, the method may include displaying the content at a current distribution time point after all of the plurality of contextual content clips have been displayed. For example, referring to FIG. 4B, the sporting event may be displayed live (e.g., 406b of FIG. 4B) after all of the contextual clips (e.g., 402b, 403b, 404b, 405b of FIG. 4b) have been displayed. In some embodiments, additional contextual clips (e.g., 408c of FIG. 4C) may be identified during the display of the contextual clips (as a result of a significant event occurring in the live sporting event), and the additional contextual clips may be appended to the display of the contextual clips prior to displaying the live sporting event (e.g., 406c of FIG. 4C).

As previously discussed, in some embodiments the contextual clip generator, the client terminal, the encoder, the content server, the web servers, or other aspects of the disclosed system may comprise one or more software or hardware computer systems and may further comprise or be operably coupled to one or more hardware memory systems for storing information including databases for storing, accessing, and querying various content, encoded data, shard addresses, metadata, and the like. In hardware implementations, the one or more computer systems incorporate one or more computer processors and controllers.

The components of the various embodiments discussed herein may each comprise a hardware processor of the one or more computer systems, and in one embodiment a single processor may be configured to implement the various components. For example, in one embodiment, the contextual clip generator, the encoder, the content server, and the web server, or combinations thereof, may be implemented as separate hardware systems, or may be implemented as a single hardware system. The hardware system may include various transitory and non-transitory memory for storing information, wired and wireless communication receivers and transmitters, displays, and input and output interfaces and devices. The various computer systems, memory, and components of the system may be operably coupled to communicate information, and the system may further include various hardware and software communication modules, interfaces, and circuitry to enable wired or wireless communication of information.

Figure 11:
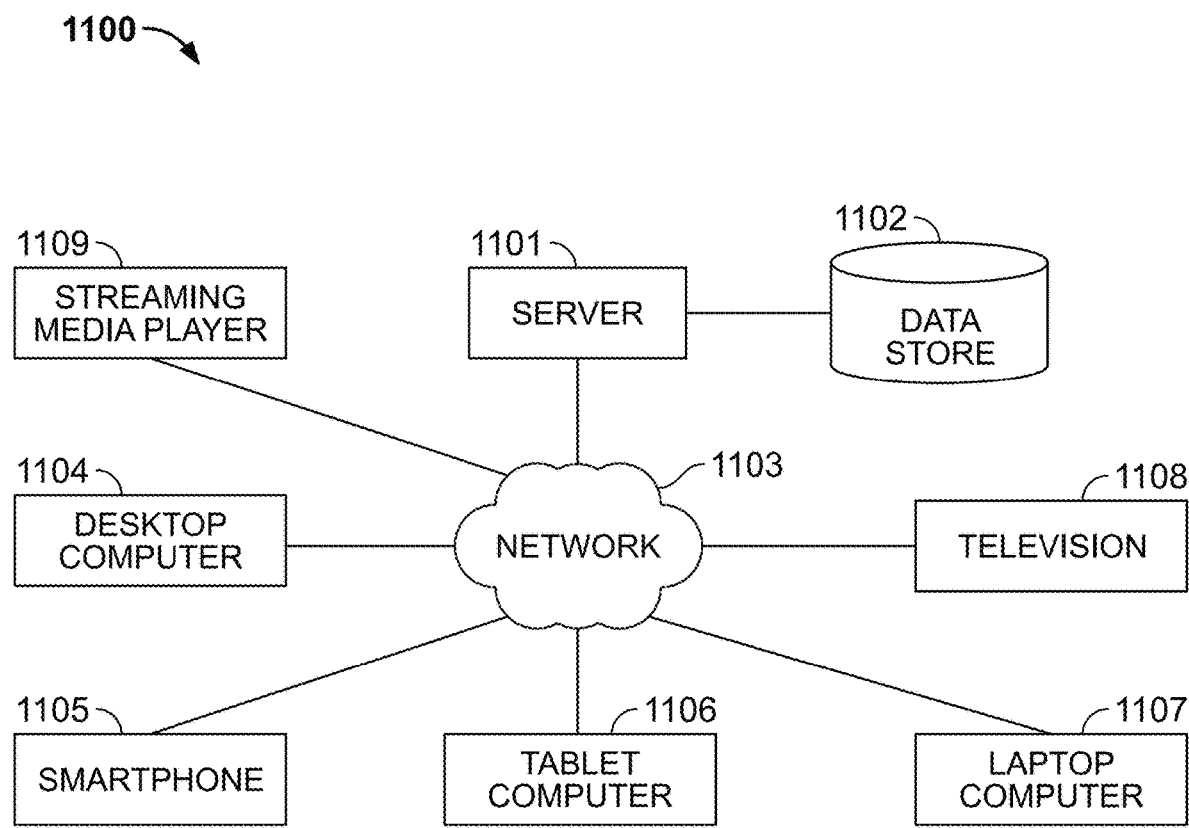
FIG. 11 is an illustration of a computing environment in accordance with an embodiment of the present disclosure.

In selected embodiments, the features and aspects disclosed herein may be implemented within a computing environment 1100 shown in FIG. 11, which may include one or more computer servers 1101. The server 1101 may be operatively coupled to one or more data stores 1102 (e.g., databases, indexes, files, or other data structures). The server 1101 may connect to a data communication network 1103 comprising a local area network (LAN), a wide area network (WAN) (e.g., the Internet), a telephone network, a satellite or wireless communication network, or some combination of these or similar networks.

One or more client devices 1104, 1105, 1106, 1107, 1108, 1109 may be in communication with the server 1101, and a corresponding data store 1102 via the data communication network 1103. Such client devices 1104, 1105, 1106, 1107, 1108, 1109 may include, for example, one or more laptop computers 1107, desktop computers 1104, smartphones and mobile phones 1105, tablet computers 1106, televisions 1108, streaming media players 1109, or combinations thereof. In operation, such client devices 1104, 1105, 1106, 1107, 1108, 1109 may send and receive data or instructions from or to the server 1101, in response to user input received from user input devices or other input. In response, the server 1101 may serve data from the data store 1102, alter data within the data store 1102, add data to the data store 1102, or the like or combinations thereof.

In selected embodiments, the server 1101 may stream or transmit one or more video files including video content, audio content, encoded data, generated data, and/or metadata from the data store 1102 to one or more of the client devices 1104, 1105, 1106, 1107, 1108, 1109 via the data communication network 1103. The devices may output video content from the video file using a display screen, projector, or other video output device. For example, the video file may comprise a clip of a movie, television show, live programming, news broadcast, or portion thereof for output using a display device of one or more of the client devices. In certain embodiments, the system 1100 configured in accordance with the features and aspects disclosed herein may be configured to operate within or support a cloud computing environment. For example, a portion of, or all of, the data store 1102 and server 1101 may reside in a cloud server.

Figure 12:
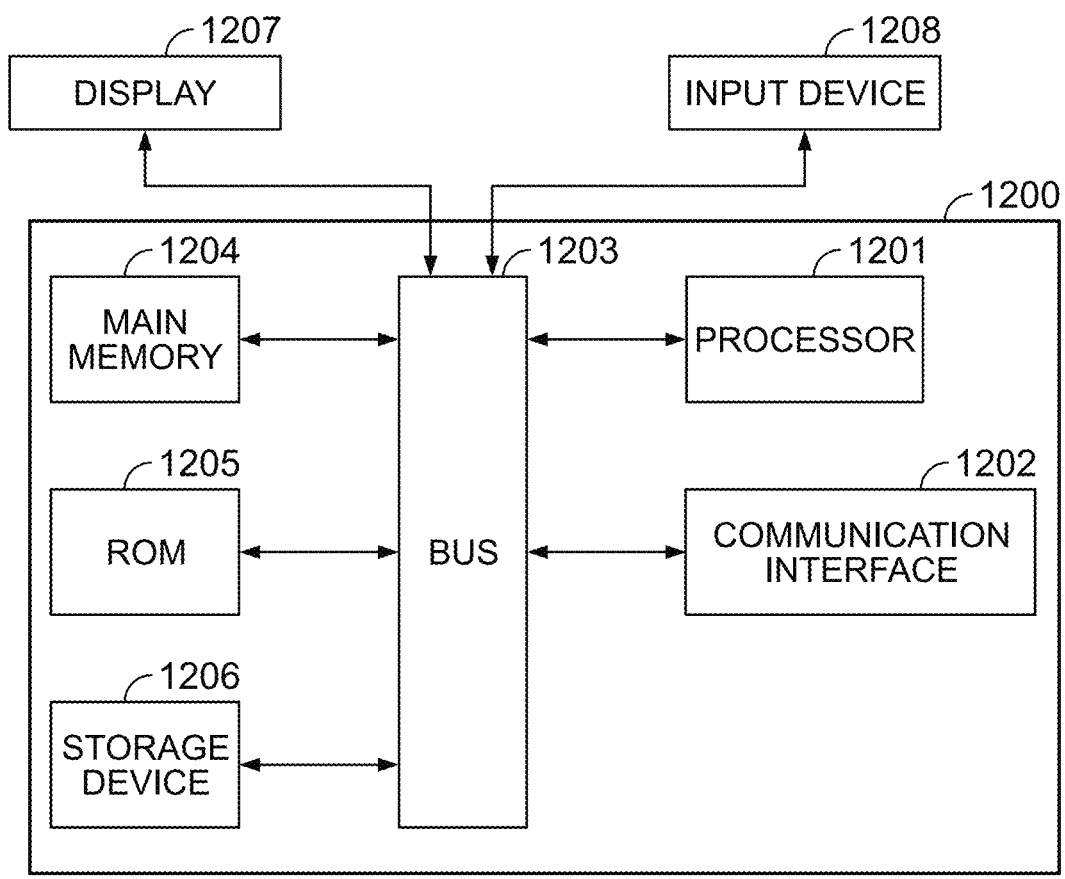
FIG. 12 is an illustration of a device in accordance with an embodiment of the present disclosure.

Referring to FIG. 12, an illustration of an example computer 1200 is provided. One or more of the devices 1104, 1105, 1106, 1107, 1108, 1109 of the system 1100 may be configured as or include such a computer 1200. In selected embodiments, the computer 1200 may include a bus 1203 (or multiple buses) or other communication mechanism, a processor 1201, main memory 1204, read only memory (ROM) 1205, one or more additional storage devices 1206, and/or a communication interface 1202, or the like or sub-combinations thereof. The embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In all embodiments, the various components described herein may be implemented as a single component, or alternatively may be implemented in various separate components.

A bus 1203 or other communication mechanism, including multiple such buses or mechanisms, may support communication of information within the computer 1200. The processor 1201 may be connected to the bus 1203 and process information. In selected embodiments, the processor 1201 may be a specialized or dedicated microprocessor configured to perform particular tasks in accordance with the features and aspects disclosed herein by executing machine-readable software code defining the particular tasks. Main memory 1204 (e.g., random access memory—or RAM—or other dynamic storage device) may be connected to the bus 1203 and store information and instructions to be executed by the processor 1201. Main memory 1204 may also store temporary variables or other intermediate information during execution of such instructions.

ROM 1205 or some other static storage device may be connected to a bus 1203 and store static information and instructions for the processor 1201. An additional storage device 1206 (e.g., a magnetic disk, optical disk, memory card, or the like) may be connected to the bus 1203. The main memory 1204, ROM 1205, and the additional storage device 1206 may include a non-transitory computer-readable medium holding information, instructions, or some combination thereof, for example instructions that when executed by the processor 1201, cause the computer 1200 to perform one or more operations of a method as described herein. A communication interface 1202 may also be connected to the bus 1203. A communication interface 1202 may provide or support two-way data communication between a computer 1200 and one or more external devices (e.g., other devices contained within the computing environment).

In selected embodiments, the computer 1200 may be connected (e.g., via a bus) to a display 1207. The display 1207 may use any suitable mechanism to communicate information to a user of a computer 1200. For example, the display 1207 may include or utilize a liquid crystal display (LCD), light emitting diode (LED) display, projector, or other display device to present information to a user of the computer 1200 in a visual display. One or more input devices 1208 (e.g., an alphanumeric keyboard, mouse, microphone) may be connected to the bus 1203 to communicate information and commands to the computer 1200. In selected embodiments, one input device 1208 may provide or support control over the positioning of a cursor to allow for selection and execution of various objects, files, programs, and the like provided by the computer 1200 and displayed by the display 1207.

The computer 1200 may be used to transmit, receive, decode, display, or the like one or more video files. In selected embodiments, such transmitting, receiving, decoding, and displaying may be in response to the processor 1201 executing one or more sequences of one or more instructions contained in main memory 1204. Such instructions may be read into main memory 1204 from another non-transitory computer-readable medium (e.g., a storage device).

Execution of sequences of instructions contained in main memory 1204 may cause the processor 1201 to perform one or more of the procedures or steps described herein. In selected embodiments, one or more processors in a multi-processing arrangement may also be employed to execute sequences of instructions contained in main memory 1204. Alternatively, or in addition thereto, firmware may be used in place of, or in connection with, software instructions to implement procedures or steps in accordance with the features and aspects disclosed herein. Thus, embodiments in accordance with the features and aspects disclosed herein may not be limited to any specific combination of hardware circuitry and software.

Non-transitory computer readable medium may refer to any medium that participates in holding instructions for execution by the processor 1201, or that stores data for processing by a computer, and comprise all computer-readable media, with the sole exception being a transitory, propagating signal. Such a non-transitory computer readable medium may include, but is not limited to, non-volatile media, volatile media, and temporary storage media (e.g., cache memory). Non-volatile media may include optical or magnetic disks, such as an additional storage device. Volatile media may include dynamic memory, such as main memory. Common forms of non-transitory computer-readable media may include, for example, a hard disk, a floppy disk, magnetic tape, or any other magnetic medium, a CD-ROM, DVD, Blu-ray or other optical medium, RAM, PROM, EPROM, FLASH-EPROM, any other memory card, chip, or cartridge, or any other memory medium from which a computer can read.

In selected embodiments, a communication interface 1202 may provide or support external, two-way data communication to or via a network link. For example, a communication interface 1202 may be a wireless network interface controller or a cellular radio providing a data communication network connection. Alternatively, a communication interface 1202 may comprise a local area network (LAN) card providing a data communication connection to a compatible LAN. In any such embodiment, a communication interface 1202 may send and receive electrical, electromagnetic, or optical signals conveying information.

A network link may provide data communication through one or more networks to other data devices (e.g., client devices as shown in the computing environment 1100). For example, a network link may provide a connection through a local network of a host computer or to data equipment operated by an Internet Service Provider (ISP). An ISP may, in turn, provide data communication services through the Internet. Accordingly, a computer 1200 may send and receive commands, data, or combinations thereof, including program code, through one or more networks, a network link, and communication interface 1202. Thus, the computer 1200 may interface or otherwise communicate with a remote server (e.g., server 1101), or some combination thereof.

The various devices, modules, terminals, and the like discussed herein may be implemented on a computer by execution of software comprising machine instructions read from computer-readable medium, as discussed above. In certain embodiments, several hardware aspects may be implemented using a single computer, in other embodiments multiple computers, input/output systems and hardware may be used to implement the system.

For a software implementation, certain embodiments described herein may be implemented with separate software modules, such as procedures and functions, each of which perform one or more of the functions and operations described herein. The software codes can be implemented with a software application written in any suitable programming language and may be stored in memory and executed by a controller or processor.

The foregoing disclosed embodiments and features are merely exemplary and are not to be construed as limiting the present invention. The present teachings can be readily applied to other types of apparatuses and processes. The description of such embodiments is intended to be illustrative, and not to limit the scope of the claims. Many alternatives, modifications, and variations will be apparent to those skilled in the art.

What is claimed is:

1. A terminal for presenting clips for distributed content, the terminal comprising:
one or more controllers configured to:
receive an input for presenting content while the content is currently being distributed live at a first time point within the content;
transmit a request for clips of the content comprising events of the content which occurred prior to the first time point within the content;
receive information for displaying a plurality of clips of the content comprising events of the content which occurred prior to the first time point within the content; and
display, via a display associated with the terminal, the plurality of clips of the content using the received information before a remainder of the content is displayed,
wherein the content corresponds to a sporting event and the plurality of clips of the content are selected for display based on an importance of the one or more of clips to an overall outcome of the sporting event, and
wherein the one or more controllers are further configured to:
transmit a request for secondary content to be displayed simultaneously with the content;
receive information for displaying a plurality of secondary content items simultaneously with the content; and
withhold from display a particular secondary content item during display of the plurality of clips of the content based on a timestamp of the particular secondary content item being later than a timestamp of a particular clip of the displayed plurality of clips being displayed,
wherein the secondary content corresponds to game score information to be displayed along with the content and the particular secondary content item relates to a current status of the sporting event as it is currently being distributed live.

2. The terminal of claim 1, wherein the remainder of the content is displayed starting from the first time point within the content.

3. The terminal of claim 1, wherein the remainder of the content is displayed as it is currently being distributed live.

4. The terminal of claim 1, wherein the one or more controllers are further configured to:
display, via the display, one or more selectable options for inputting criteria of clips of the content to be displayed; and
receive at least one input to the displayed one or more selectable options for selecting at least one criteria of clips of the content,
wherein the transmitted request includes information of the selected at least one criteria of clips of the content.

5. The terminal of claim 4, wherein the one or more selectable options comprises an option for setting a total length of time for displaying the plurality of clips of the content.

6. The terminal of claim 5, wherein the plurality of clips of the content are selected for display further based on the set total length of time for displaying the plurality of clips of the content.

7. The terminal of claim 1, wherein the importance of each of the one or more clips is determined by a corresponding rating score for each clip being greater than or equal to a rating score threshold.

8. The terminal of claim 1, wherein the one or more controllers are configured to display, via the display, the remainder of the content starting from the first time point within the content in response to the input for presenting content without displaying the plurality of clips of the content if the first time point is prior to a minimum threshold time point within the content.

9. The terminal of claim 1, wherein the one or more controllers are configured to display, via the display, the remainder of the content starting from the first time point within the content in response to the input for presenting content without displaying the plurality of clips of the content if the first time point is after a maximum threshold time point within the content or if a total length of the plurality of clips of the content is greater than a predicted remaining time of the remainder of the content.

10. The terminal of claim 1, wherein the one or more controllers are further configured to display a timeline while the content is being displayed, and display one or more indicators on the timeline corresponding to significant events which have occurred during the content.

11. A method for presenting clips for distributed content, the method comprising:
receiving an input for presenting content while the content is currently being distributed live at a first time point within the content;
transmitting a request for clips of the content comprising events of the content which occurred prior to the first time point within the content;
receiving information for displaying a plurality of clips of the content comprising events of the content which occurred prior to the first time point within the content;
displaying the plurality of clips of the content using the received information before a remainder of the content is displayed, wherein the content corresponds to a sporting event and the plurality of clips of the content are selected for display based on an importance of the one or more of clips to an overall outcome of the sporting event;
transmitting a request for secondary content to be displayed simultaneously with the content;
receiving information for displaying a plurality of secondary content items simultaneously with the content; and
withholding from display a particular secondary content item during display of the plurality of clips of the content based on a timestamp of the particular secondary content item being later than a timestamp of a particular clip of the displayed plurality of clips being displayed,
wherein the secondary content corresponds to game score information to be displayed along with the content and the particular secondary content item relates to a current status of the sporting event as it is currently being distributed live.

12. The method of claim 11, wherein the remainder of the content is displayed starting from the first time point within the content.

13. The method of claim 11, wherein the remainder of the content is displayed as it is currently being distributed live.

14. The method of claim 11, wherein the plurality of clips of the content are selected for display further based on the set total length of time for displaying the plurality of clips of the content.

15. The method of claim 11, wherein the importance of each of the one or more clips is determined by a corresponding rating score for each clip being greater than or equal to a rating score threshold.

16. The method of claim 11, further comprising displaying a timeline while the content is being displayed, and displaying one or more indicators on the timeline corresponding to significant events which have occurred during the content.

* * * * *